(12) United States Patent
Bergin (10) Patent No.: US 6,283,551 B1
(45) Date of Patent: *Sep. 4, 2001

(54) PIVOTING ARMREST WITH CUPHOLDER

(75) Inventor: Peter W. A. Bergin, Eden Prairie, MN (US)

(73) Assignee: Media Technology Source, Inc., Minneapolis, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/348,777

(22) Filed: Jul. 7, 1999

(51) Int. Cl.[7] ................................. A47C 7/54; B60N 2/46
(52) U.S. Cl. ............................. 297/411.35; 297/411.2; 297/411.3; 297/411.32; 297/188.14
(58) Field of Search ...................... 297/411.35, 411.25, 297/411.3, 411.32, 411.38, 188.01, 188.14, 188.15; 248/345.1

(56) References Cited

U.S. PATENT DOCUMENTS

| | | |
|---|---|---|
| D. 326,589 | 6/1992 | White et al. ..................... D7/620 |
| D. 350,259 | 9/1994 | Ayotte ............................. D7/620 |
| 2,704,114 | 3/1955 | Williams . |
| 4,141,586 * | 2/1979 | Goldner et al. .............. 297/411.3 X |
| 4,270,798 * | 6/1981 | Harder, Jr. .................. 297/411.35 X |
| 4,331,360 | 5/1982 | Roudybush et al. . |
| 4,435,011 * | 3/1984 | Hakamata ................... 297/411.32 X |
| 4,613,048 | 9/1986 | McGill . |
| 4,795,211 | 1/1989 | Stern et al. . |
| 4,863,134 | 9/1989 | Young et al. . |
| 5,232,262 | 8/1993 | Tseng . |
| 5,234,251 | 8/1993 | Ayotte ............................. 297/188.14 |
| 5,238,212 | 8/1993 | Dechellis . |
| 5,302,000 | 4/1994 | Ayotte ............................. 297/188.14 |
| 5,320,406 * | 6/1994 | North ............................. 297/188.14 |
| 5,342,115 * | 8/1994 | De Filippo .................. 297/411.32 X |
| 5,409,297 * | 4/1995 | De Filippo ..................... 297/411.32 |
| 5,660,433 * | 8/1997 | Bruhnke et al. ............. 297/411.32 X |
| 5,678,896 * | 10/1997 | Chung ......................... 297/411.32 X |
| 5,769,495 * | 6/1998 | Vairinen ......................... 297/411.2 |
| 5,997,081 * | 12/1999 | Kayumi ......................... 297/188.14 |
| 6,047,444 * | 4/2000 | Braun .......................... 297/411.32 X |
| 6,050,645 * | 4/2000 | Bradbury .................... 297/411.32 X |

FOREIGN PATENT DOCUMENTS

3143957 A1   11/1981   (DE) .

* cited by examiner

Primary Examiner—Peter M. Cuomo
Assistant Examiner—Rodney B. White
(74) Attorney, Agent, or Firm—Westman, Champlin & Kelly, P.A.

(57) ABSTRACT

An armrest has a cupholder at one end, and is adapted to be pivotally mounted between theater seats that have backrest portions. The armrest with the cupholder is pivotally movable from a generally horizontal position where it can support the arms of a person sitting in the seat, to a generally vertical position where it substantially fills the space between adjacent backrests, and provides a surface that forms a backrest continuation when the arm is pivoted upwardly. The armrest has pads at both the upper and lower surfaces thereof so that it is padded when it is being used as an armrest and also when it is forming a continuation of the backrest of the two adjacent seats.

16 Claims, 7 Drawing Sheets

Fig. 9

PIVOTING ARMREST WITH CUPHOLDER

BACKGROUND OF THE INVENTION

The present invention relates to an armrest for a seat, such as a theater or stadium seat, which pivots from a usable position where it is generally horizontal for use as an armrest, to a position where it is substantially vertical, and positioned between seat backs of adjacent seats. The armrest is constructed with a pad or cushion on both top and bottom sides, so that there is padding on top when it is in its horizontal position acting as an armrest and a finished fabric appearance when the armrest is raised and positioned between adjacent seat backs, where it functions as a filler back rest between the seat backs.

Cupholders on the ends of armrests have been developed before, as evidenced by U.S. Pat. No. 5,302,000, but with the onset of stadium seating in theaters in particular, the theater chairs have become more luxurious, and incorporate features such as pivoting arms that will raise up to be positioned between two adjacent seat backs from a generally horizontal position where they act as an armrest for the seat occupant. The previous cupholder arm rests are not adapted for pivoting.

SUMMARY OF THE INVENTION

The present invention relates to a pivoting armrest and cupholder for seats which will pivot from a generally horizontal position for supporting an arm on a cushion top, to a position wherein the armrest is between and conforms to the configuration of the seat backs of the seat on which it is mounted and an adjacent seat. Theater or stadium seats generally are in rows, so one armrest will be mounted on each of the seats except for the end seats, which will have generally fixed horizontal armrests.

The present pivoting armrest has a cupholder configured so that it will be recessed out of the way when the arm is pivoted to its second position between adjacent seat backs.

A metal channel frame is utilized as a support for the arm and to provide a pivot structure. A molded armrest housing mounts over the channel and is held in position. The molded armrest has the cupholder molded in place as an integral assembly so that the device is easy to make and easy to mount. The armrest has members positioned to mount identical pads on both the top and bottom of the armrest. When the armrest is generally horizontal and is being used to rest an arm, there is a pad on the top, and the bottom pad becomes a backrest portion facing the same way as the backrests when the armrest is pivoted to position between the adjacent seat backs.

The armrest thus presents a luxury finish in both of its positions, and a fully functioning cupholder that is available at the outer end of the arm in its armrest position.

DETAILED DESCRIPTION OF THE ILLUSTRATIVE EMBODIMENTS

Figure 1:
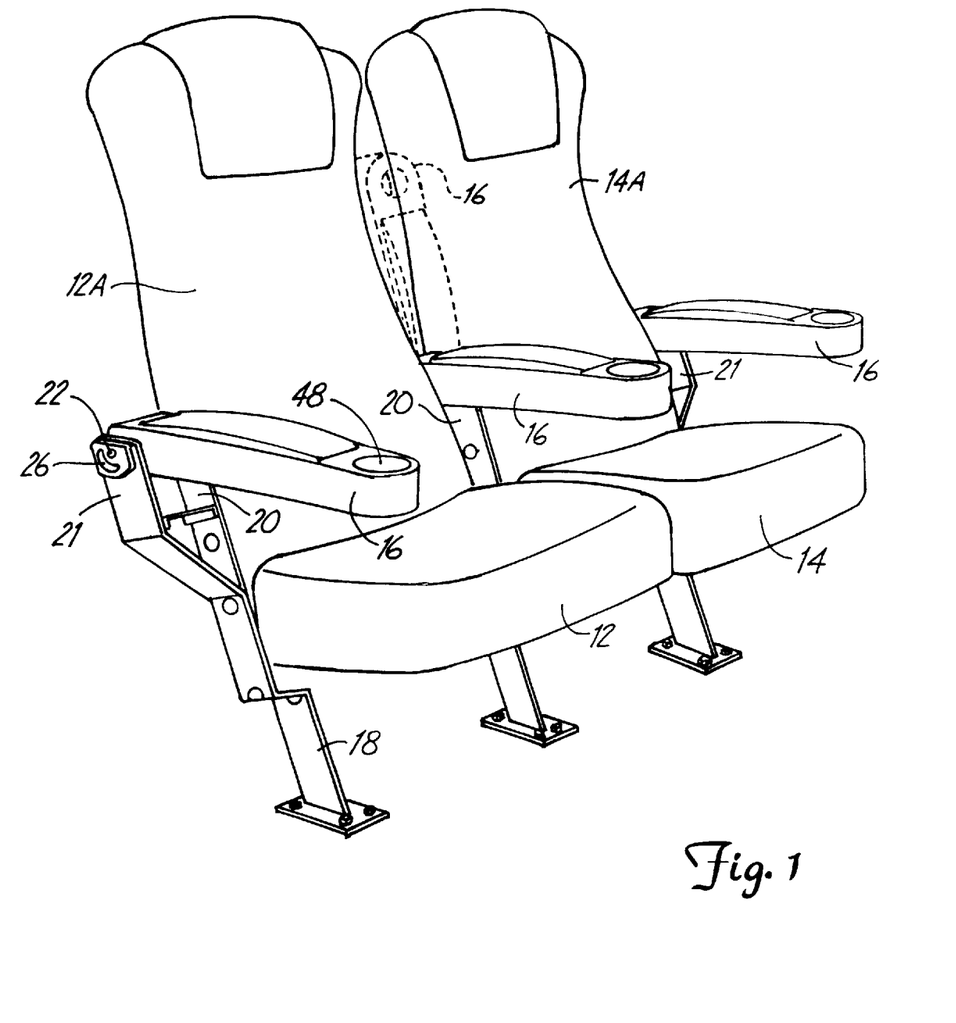
FIG. 1 is a perspective view of a pair of stadium seats used in theaters, and having an armrest made according to the present invention installed thereon.

Referring in FIG. 1, stadium seating indicated generally at 10 is used in modern theaters, includes that a first seat 12 and a second seat 14 that are mounted adjacent to each other. Additional seats would be mounted in a row. The seats 12 and 14 each include a backrest 12A and 14A, respectively, and an upwardly folding or pivoting armrest 16 is mounted between the seats.

Figure 2:
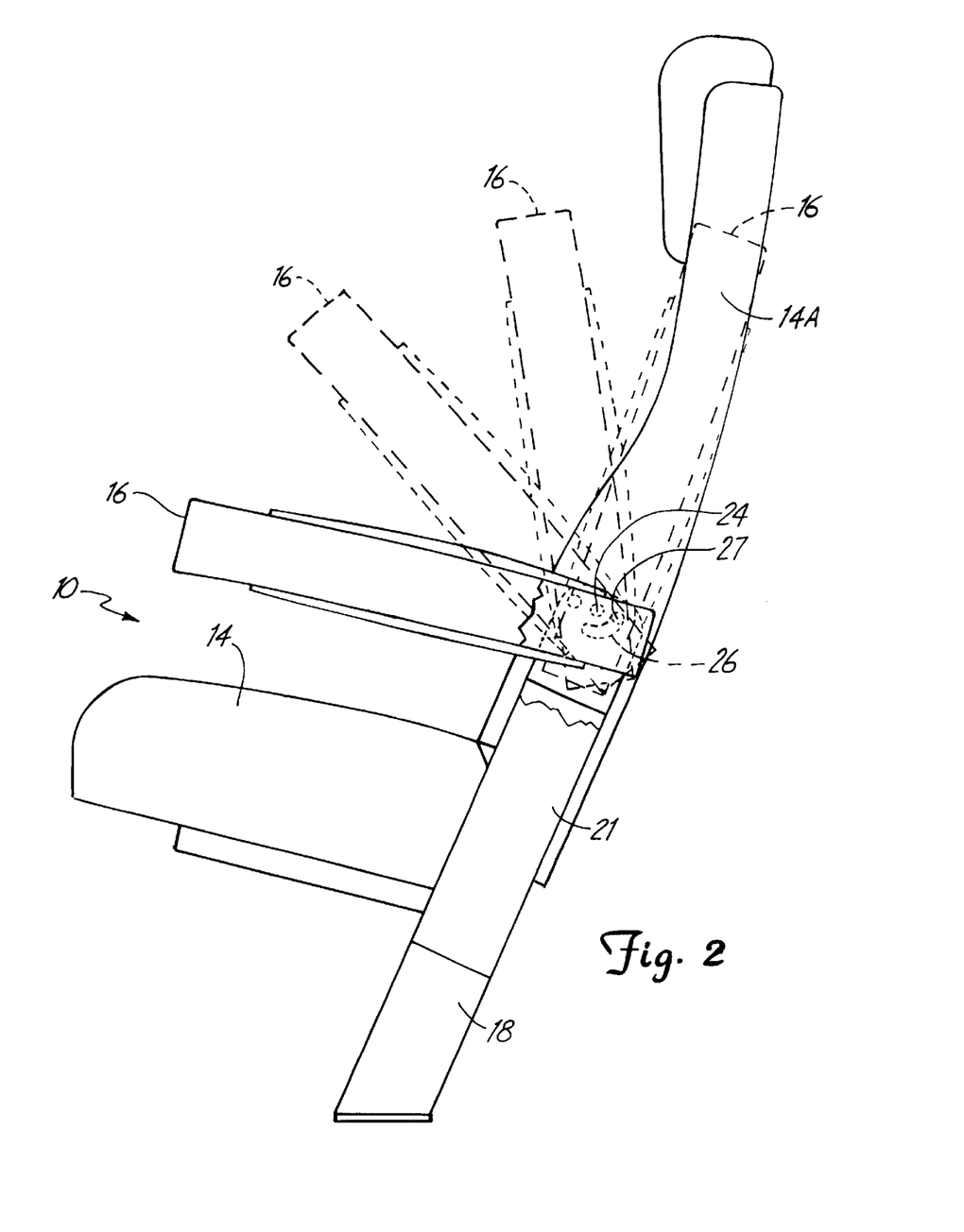
FIG. 2 is a side elevational view of a seat of FIG. 1 showing the armrest of the present invention.

The seats include fixed frames or standards 18 that are mounted on the floor and extend upwardly to support the seat frame and are offset laterally to extend along the seat backs. The seat standards include an upper end portion 20 and a bracket 21 that is spaced from and parallel to the upper end portion 20. The armrest 16 is positioned between the upper end portion 20 and the bracket 21 and is pivotally mounted thereto. Suitable holes including a pivot pin hole 22, and a guide slot 26 are provided in the standard and offset bracket (FIG. 1). A pivot pin 24 forms the pivotal mounting (FIG. 2).

Slot 26 in the standard and bracket retains a guide pin 27 that passes through the slot and is mounted on the arm. The guide pin 27 is attached to the arm 16 and is received in a slot 26 on both sides of the arm. The slot 26 is in both bracket 21 and the upper end 20 of standard 18 so the pin 27 forms a stop at the ends of the slots, as well as guiding pivoting movement of the arm 16.

Figure 3:
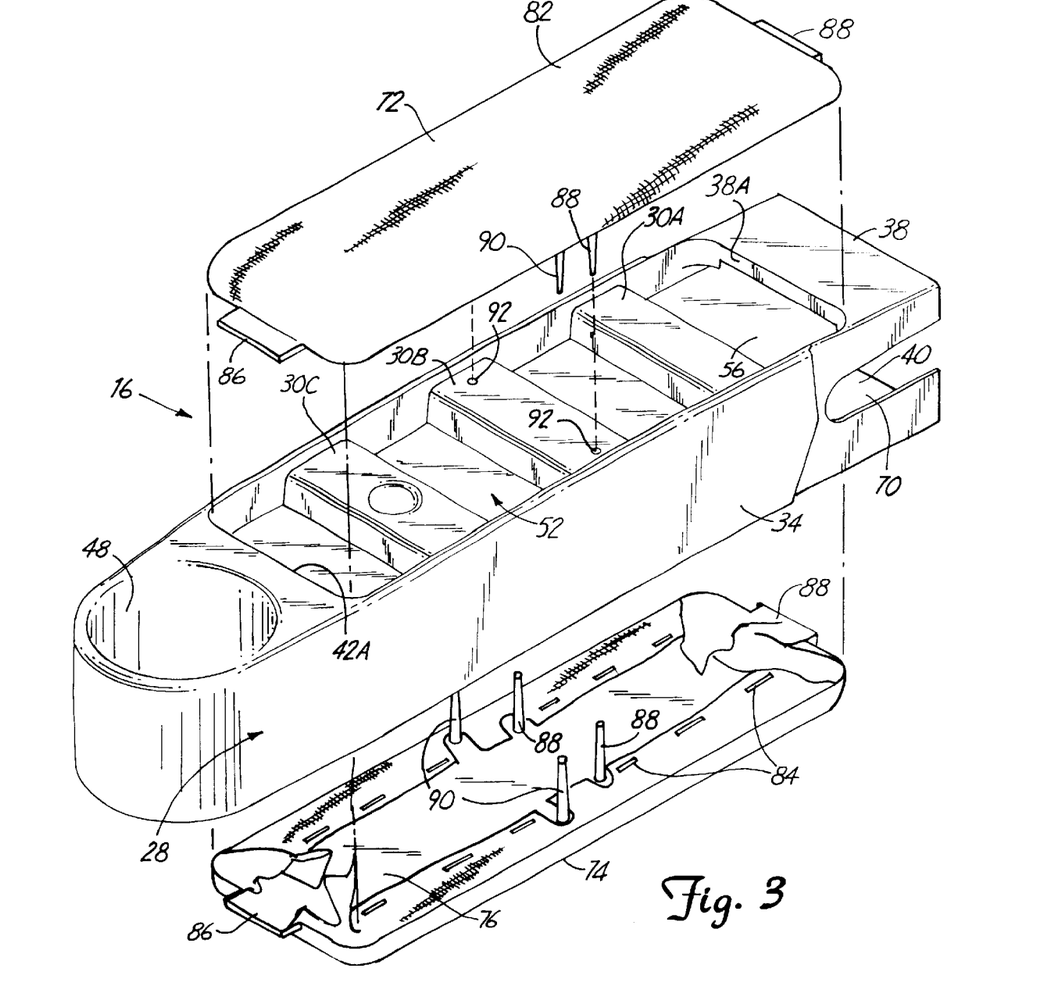
FIG. 3 is an exploded perspective of the armrest made according to the present invention.
Figure 4:
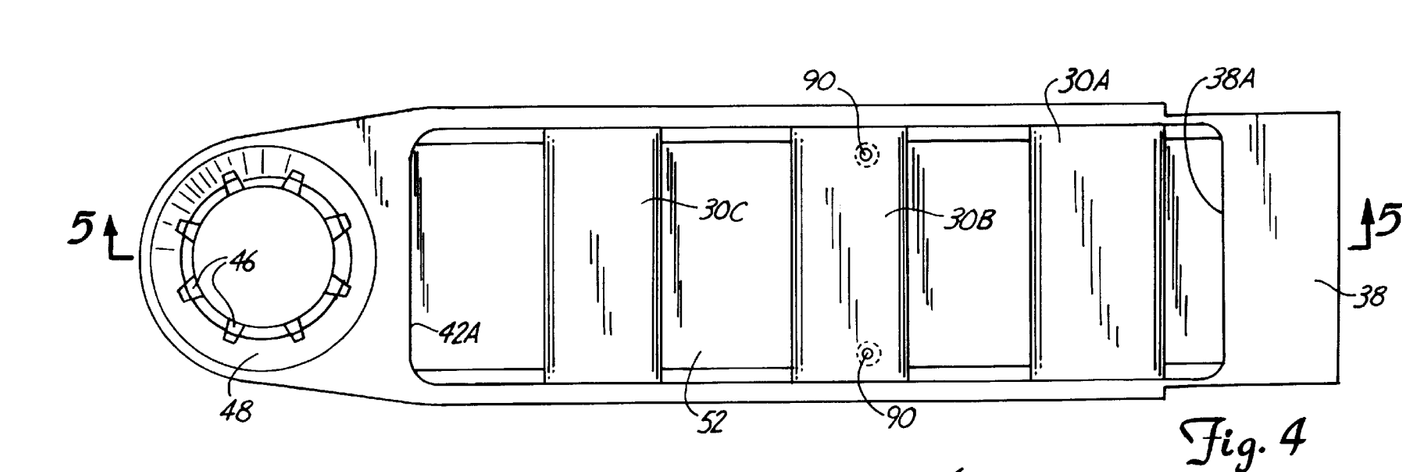
FIG. 4 is a top plan view of the housing of the armrest with the upper armrest pad removed.

The pivoting armrest 16 is shown in exploded view in FIG. 3, and includes a molded outer housing or shell 28, that has side walls 34 and 36, which are joined together with a top cross wall 38 and a bottom cross wall 40 at the pivoting end of the arm 16. There are also a series of channel shaped top cross members or support walls 30A, 30B and 30C on the upper side (when the armrest is in its horizontal or working position as shown in FIG. 1). The side walls 34 and 36 are also held together with three lower cross members 32A, 32B and 32C on the lower side. The side walls 34 and 36 are spaced apart, and leave openings at the top and bottom. The cross members 30A–30C are recessed slightly below the upper edges of the side walls for mounting a pad. The lower cross members are also recessed upwardly slightly in from the lower edges of the side walls for receiving the lower pad.

The rear cross walls 38 and 40 form a box section at the pivoting end of the arm. There is a front wall 42 that extends between the forward ends of the side walls 34 and 36 and holds them together. A cupholder 44 is molded in place and extends forwardly from the front wall. The cupholder 44 is an annular wall that, as shown, has suitable shoulder members 46, positioned around the central axis of the wall. The shoulder members 46 support a cup on an interior cupholder receptacle 48. Receptacle 48 has an open top and a drink cup can be inserted and supported on the bottom of the receptacle. Instead of shoulder members, the bottom of the receptacle can have cross straps or other wall portions for supporting a drink cup.

Figure 5:
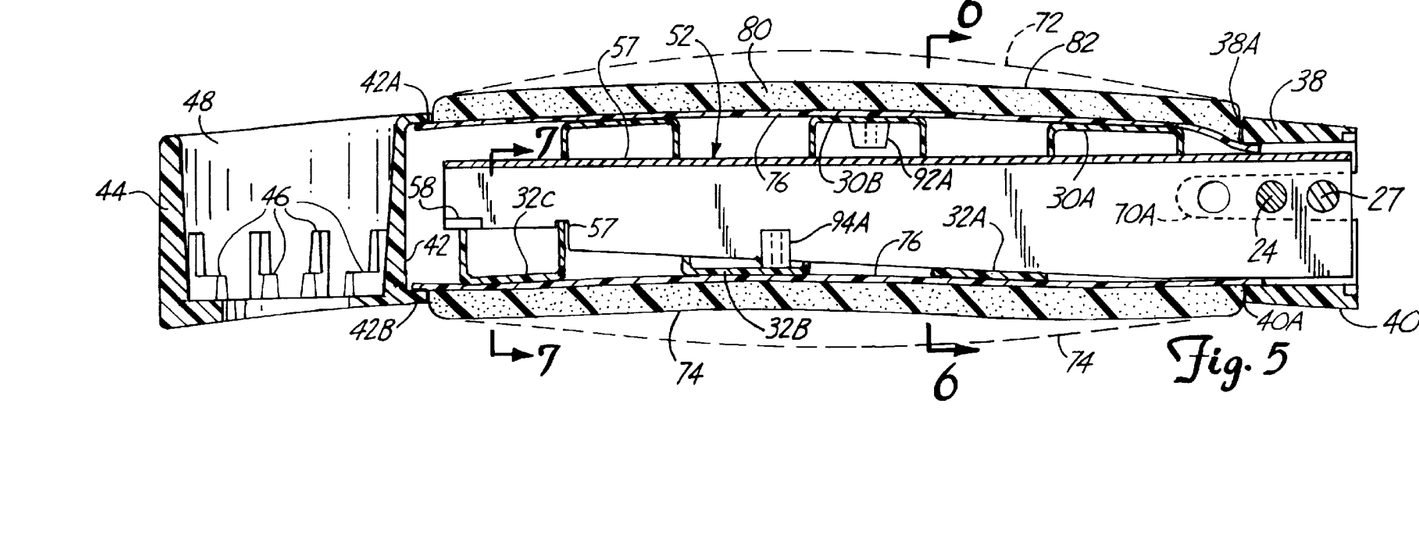
FIG. 5 is a sectional view is taken as on line 5—5 in FIG. 4.
Figure 6:
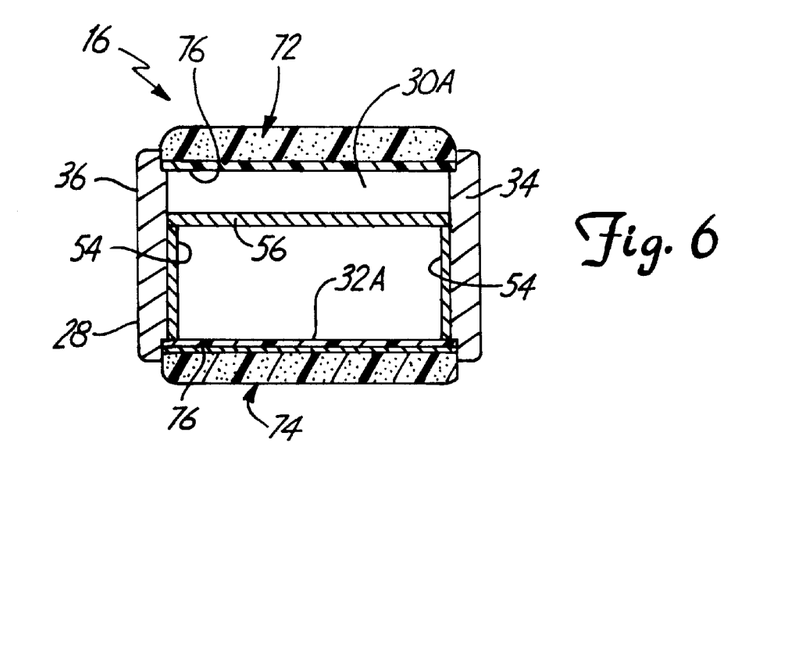
FIG. 6 is a sectional view taken on line 6—6 in FIG. 5.
Figure 7:
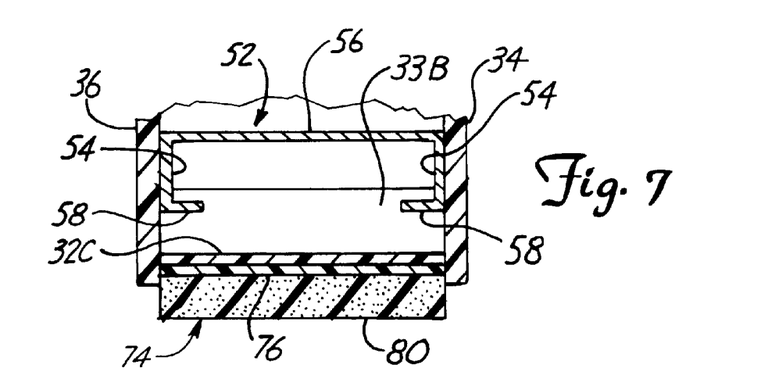
FIG. 7 is a sectional view taken on line 7—7 in FIG. 5.

The housing 28 is mounted on a pivot support channel 52 that extends from the pivot end of the arm almost to the wall 42. The pivot support channel, as shown in FIG. 5 and 6, has side walls 54 and a top wall 56 joining the side walls. The lower side of the support channel 52 is open. The side walls 54 taper upwardly from the rear to the front. The front end the side walls 54 are folded inwardly to form inwardly extending tongues 58 (see FIG. 7), extending from each of the side walls 54 and formed to slip over and bear on the top of a wall 33A of channel shaped lower cross member 32C. The walls 54 are also notched as at 57 to receive the upper edge of the wall 33B of channel shaped cross member 32C.

The lower edges of walls 54 of channel 52 are above cross member 32B and can rest on cross member 32. The top surface of top wall 56 of channel 52 bears against the depending walls of cross members 30A, 30B and 30C. The channel 52 can be forced into place until the notch 57 snaps over wall 33B because of the resiliency of the housing, and then the channel 52 is held in place to support the housing.

The rear portions of the side walls 54 are provided with openings in which the pivot pin 24 and guide pin 22 are supported. The guide pin extends out from the side walls and is guided in the slots 26 on the upper end portion 20 and bracket 21.

The side walls 34 and 36 of housing 28 have elongated slots 70 and 70A to provide for clearance of the pins, when the parts are mounted onto the standards of the seat.

When the channel 52 is moved into place in the outer housing or shell 28 as shown, the assembly is then ready to receive pads at the top and bottom of the armrest. The pads for the top and bottom are identically formed, and while the housing 28 has different longitudinal curvatures at the top and the bottom, the pads are made to be sufficiently resilient so that they can accommodate these differences As shown in FIG. 3, the pad 72 at the top and the pad 74 at the bottom of the arm are identically constructed, and a flat flexible plate 76 is used as a support, and then the plates are suitably covered with foam. As shown, a foam layer 80 is provided along the length of the plate 76 and then covered with a suitable fabric covering 82. The fabric covering, as can be seen in FIG. 3, is stapled in place with staples 84 in a normal manner, to completely cover the foam and provide a soft pad for the armrest.

The plate 76 has tongues 86 and 88 at opposite ends thereof, which protrude out beyond the end of the foam and fabric slightly. The tongues are used for holding the pads in place in the outer housing. In addition, the plate 76 has a first pair of lock pins 88 formed thereon and depending from the plate. These pins 88 are spaced laterally apart, as shown, and are spaced longitudinally from a second pair of pins 90 that also are integral with the plate 76.

As can be seen, the cross member 30B in FIG. 3 has a pair of openings 92 that are formed though hubs 92A (see FIGS. 3 and 5), that are spaced apart and are aligned to receive the pins 88 of the top pads 72, as shown in FIG. 3. The pins 88 serve to position the top pad and provide a frictional force to hold the pins retained in the hubs.

Figure 8:
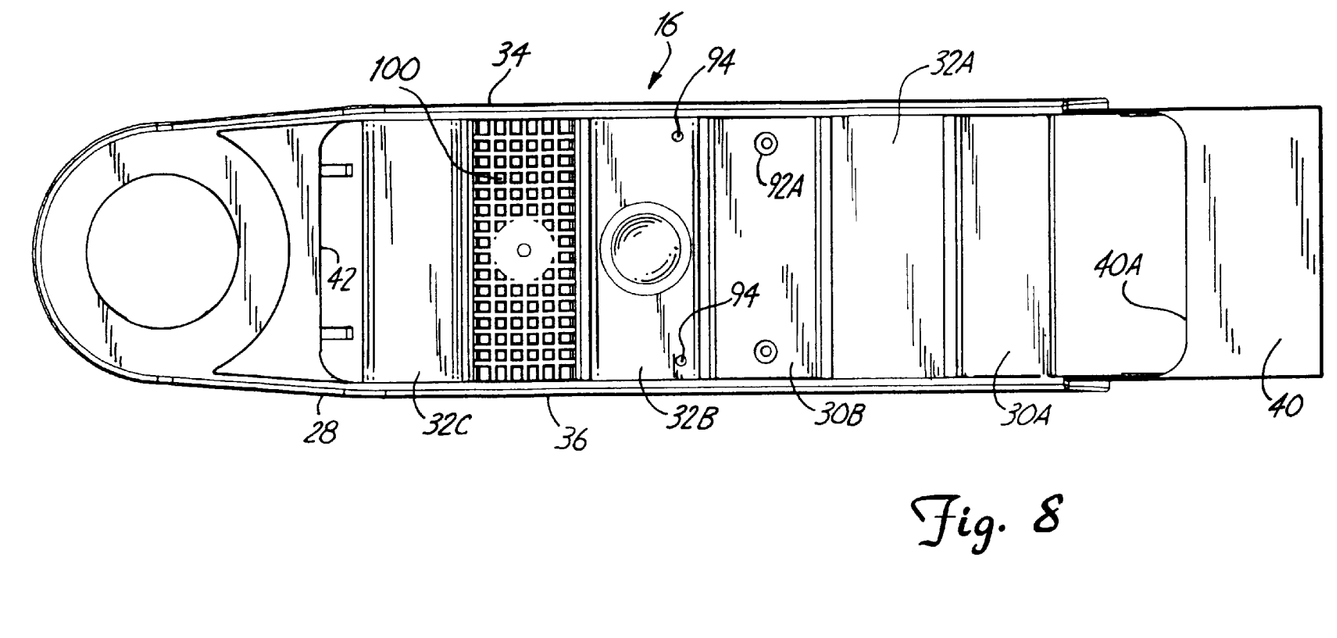
FIG. 8 is a bottom plan view of the armrest of FIG. 4 with the bottom pad removed.
Figure 9:
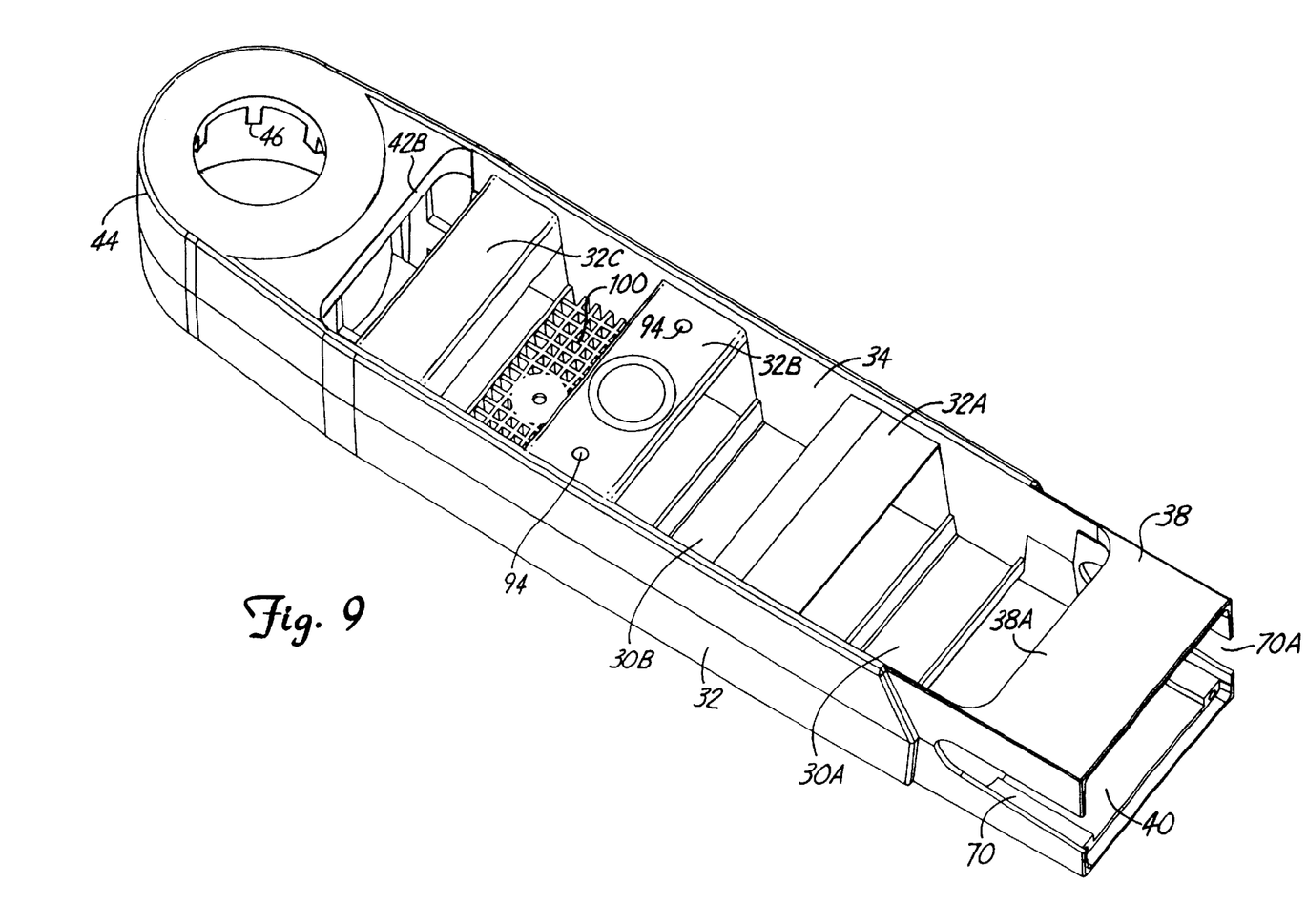
FIG. 9 is a bottom perspective view of the molded housing for the armrest.

The pins 90 are positioned so that when the pad is used as a top pad 72, the pins 90 will be positioned between the cross members 30B and 30C, and will not interfere with pad installation or use. As can be seen in FIG. 5, in particular, and also in FIG. 6, the bottom cross member 32B has openings 94 therein that are formed in upwardly extending hubs. The openings 94 are of size to receive and hold the pins 90, when the pad is being used as a bottom pad 74. The pins 88 will clear the cross members 32A–32C and merely rest in between the cross members 30A and 30B when the pad is used as a bottom pad. In FIG. 8, which is a bottom view, the openings 92 can be seen.

A reinforcing grid shown at 100 can be utilized between the side walls 34 and 36, and fill the channel shaped member 30C for extra reinforcement in an area where heaviest loads are to be encountered.

It can be seen that the rear cross walls 38 and 40 have edges that extend across the armrest between the side walls 34 and 36, and these edges are shown in FIG. 6 at 38A, and the edge for the lower wall 40 aligns therewith and is shown at 40A in FIG. 5.

The forward wall 42, extends vertically between the upper side of the armrest and the lower side, and has edge lips 42A and 42B that are formed straight across the space between the side walls 34 and 36.

The edge 38A and lip 42A at the top of the armrest, and the edges 40A and lip 42B at the lower edges are spaced so that the pad plate 76, which is flexible, can be bent up into a curve, generally as shown in dotted lines in FIG. 5 and the tongue ends 86 and 88 inserted under the edges of the front lip 42A and the edges of rear walls 38 so that the top pad will be snapped in place and will come to rest down against the upper surfaces of the cross members 30A–30C with the pins 88 in the respective holes. The tongues on the lower pad will be slipped under lip 42B and edge 40A by bending the plate 76 in a curve. The pins 90 and 88 friction fit into the holes and are forced into place to hold the pads on the plastic housing, which of course is also supported on the metal channel 52. The rear end of the housing can have an end cap installed to finish off the appearance of the arm.

Thus, the pivoting armrest 16 has a cupholder receptacle 48 at its forward end, and a pivot structure at its rear end, and is supported adequately on a metal channel with the plastic housing being made to provide a molded decorative finish, and to receive pads at both the top and the bottom of the armrest. As shown in FIG. 5, the curvature of the armrest top pad 72 is greater than the line of the outer surface of the lower pad 74, but the flexible plate 76, which is made out of a suitable plastic, will conform to these two different shapes and will be held in place securely.

Although the present invention has been described with reference to preferred embodiments, workers skilled in the art will recognize that changes may be made in form and detail without departing from the spirit and scope of the invention.

What is claimed is:

1. An armrest assembly comprising a housing, said housing having a first end and a second end, a pair of side walls defining an open top and an open bottom of substantially the same size, two pads for mounting in said open top and open bottom, respectively, said pads having a tongue portion at a first end retained on a wall portion of the housing and a retainer on a second end of the pad for holding the pad relative to the housing, said open top and open bottom receiving the respective pads.

2. The armrest of claim 1 and a cup receptacle formed at one of the first and second ends of the housing for holding a drink cup.

3. The armrest of claim 2, wherein the other of the first and second ends has a pivot support for pivotally mounting the armrest relative to a seat support standard.

4. The armrest of claim 3, and a reinforcing member mounted on an interior portion of said housing, and forming the pivot support.

5. The armrest of claim 4, wherein said reinforcing member is a channel shape, and has substantially parallel side walls, a plurality of holes in at least one end of said side walls, one of said holes mounting a pivot pin, and at least one of the other holes comprising a pin support for mounting a pin for engaging a slot in the seat support standard.

6. The armrest of claim 1, wherein said pad has a flexible plate forming a base, said tongue being at one end of said base and a second tongue at a second end 7. The armrest of claim 6 and a foam pad on the top of said plate.

8. The armrest of claim 1 wherein said pad has a first pin depending therefrom at a first longitudinal position and a second pin in a second longitudinal position and housing has a plurality of cross members adjacent the open top and adjacent the open bottom, the cross members defining a support recessed inwardly from edges of said side walls at both the top and the bottom, said cross members on the top having openings for receiving the first pin, and a cross member at the bottom of the armrest having openings for receiving the second pin.

9. The armrest of claim 8, wherein said first pin is one of a first pair of pins laterally spaced apart and the second pin is one of a second pair of pins laterally spaced apart, the cross member having openings for both pins of a pair, respectively.

10. An armrest assembly for pivotally mounting onto a seat standard and moveable from a generally horizontal position to a position adjacent a backrest of said seat and extending along a length of such backrest, said armrest assembly including a longitudinal support member, a pivot pin for mounting said support member to a support standard of the seat, a housing secured to said support member, said housing including a drink cup receptacle formed therein as an integrally formed, single one-piece structure and having supports for receiving pads at both upper and lower sides thereof.

11. The armrest of claim 10, and wherein the armrest comprises a molded housing having side walls straddling the support member, and cross members at upper and lower sides of the housing, said support member engaging the upper and lower cross members to securely hold the housing in position.

12. The armrest of claim 11, wherein said support member comprises a channel member having legs depending from a top wall, the top wall resting against first cross members at an upper side of said armrest housing, and said legs resting against at least one cross member at a lower side of the armrest housing, said legs of said channel having a notch for receiving a cross wall on the housing at an end of the support opposite from the pivot pin.

13. The armrest of claim 12, wherein said housing has cross walls at the front and rear thereof, a pad comprising a flexible plate extending longitudinally between the cross walls, and having tongue members that fit under the cross walls, while the plate rests on the cross members.

14. The armrest of claim 13, wherein said flexible plate has a pair of pins for engaging openings in at least one of the cross members of the armrest.

15. An armrest assembly for pivotally mounting onto a seat frame and movable from a generally horizontal position to an upright position adjacent a backrest for a seat on the seat frame in a direction and extending along a length of such a backrest, said armrest assembly including an armrest support member, a pivot for mounting said support member to the seat frame, the support member carrying a housing, a said housing including a drink cup receptacle formed therein as an integral one piece structure and the housing having recesses for receiving longitudinally extending armrest pads at both upper and lower sides thereof with the armrest assembly in its generally horizontal position.

16. The armrest assembly of claim 15, wherein the armrest pads extend partially out of the recesses, and fasteners for securing the pads in the recesses.

* * * * *

UNITED STATES PATENT AND TRADEMARK OFFICE
CERTIFICATE OF CORRECTION

PATENT NO. : 6,283,551 B1
DATED : September 4, 2001
INVENTOR(S) : Peter W.A. Bergin It is certified that error appears in the above-identified patent and that said Letters Patent is hereby corrected as shown below:

Column 5,
Line 5, after "end" insert the following:
-- of said base, said housing having cross walls at ends thereof, said cross walls having edges that are positioned so that the tongues slide under the cross walls, and a main portion of the plate extends between the cross wall. --

Signed and Sealed this

Eleventh Day of June, 2002

*Attest:*

JAMES E. ROGAN
*Attesting Officer*     *Director of the United States Patent and Trademark Office*